Feb. 14, 1956 K. W. HALLDEN 2,734,570
FLYING SHEARS HAVING PRESELECTED MISS-CUT ACTION
Filed April 4, 1952 6 Sheets-Sheet 1

Inventor:
Karl William Hallden
by: Steward & Sprueger
Attorneys.

Feb. 14, 1956  K. W. HALLDEN  2,734,570
FLYING SHEARS HAVING PRESELECTED MISS-CUT ACTION
Filed April 4, 1952  6 Sheets-Sheet 2
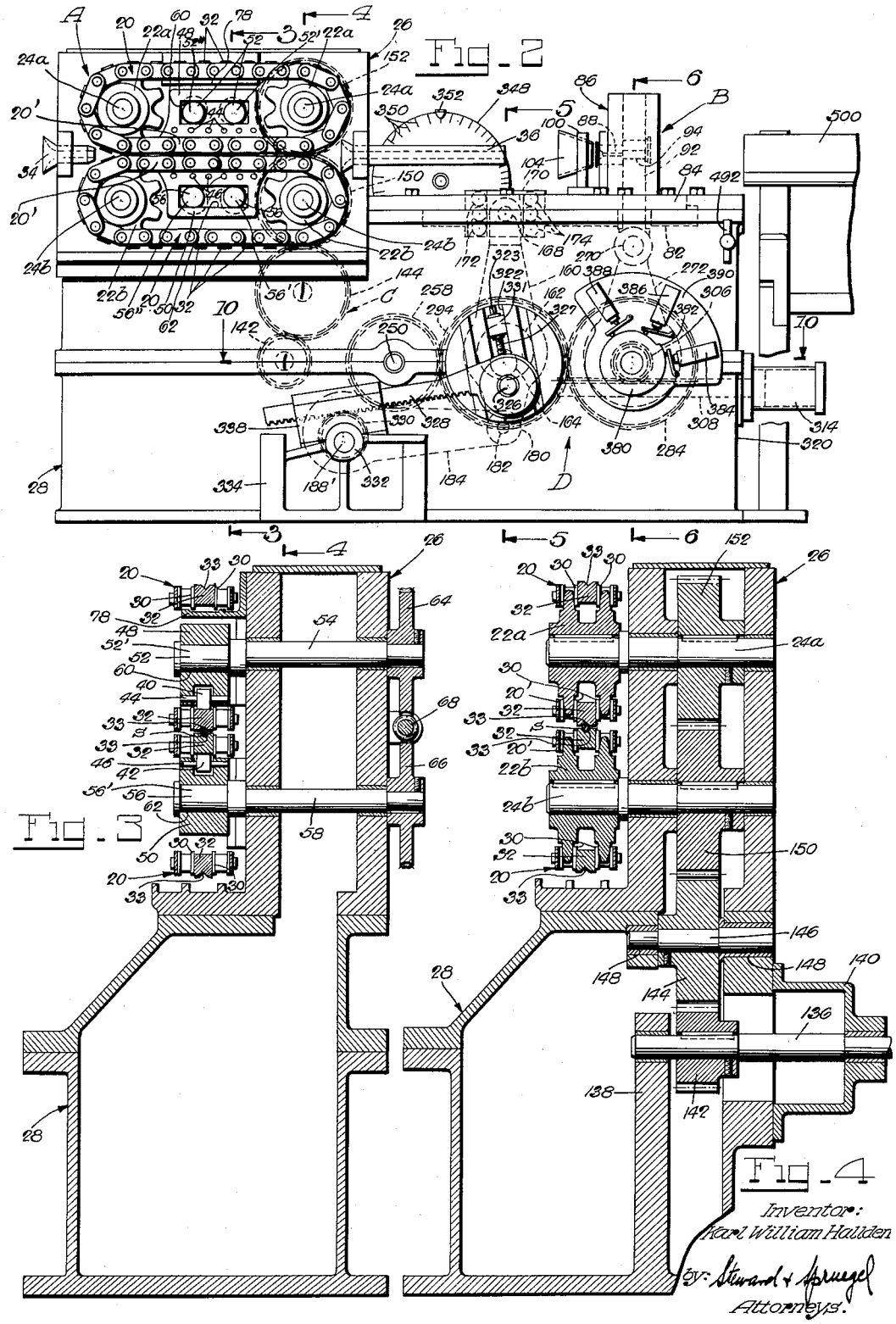
Inventor:
Karl William Hallden
By: Steward & Spruegel
Attorneys.

Feb. 14, 1956 K. W. HALLDEN 2,734,570
FLYING SHEARS HAVING PRESELECTED MISS-CUT ACTION
Filed April 4, 1952 6 Sheets-Sheet 3
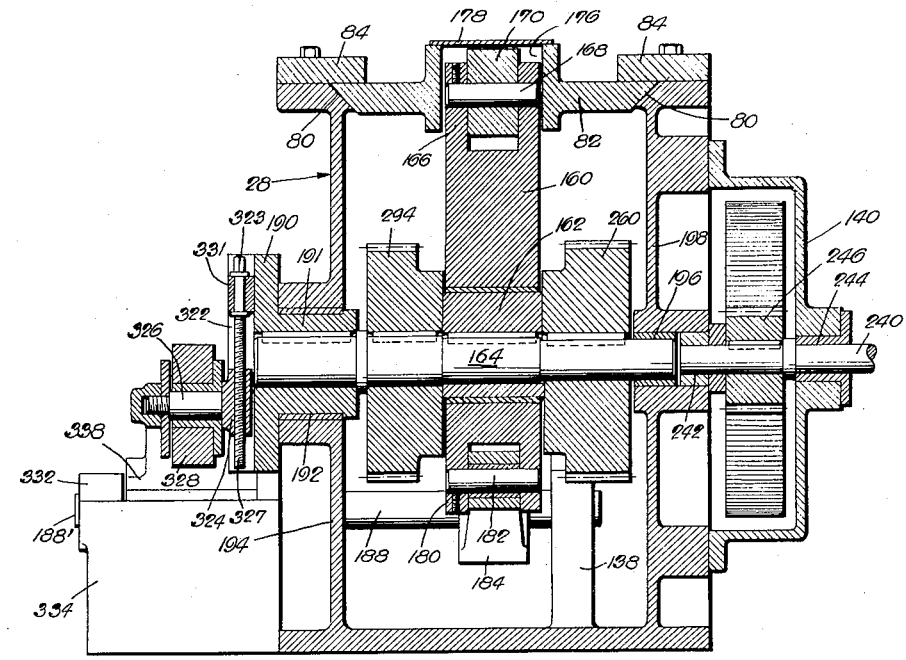
Fig. 5
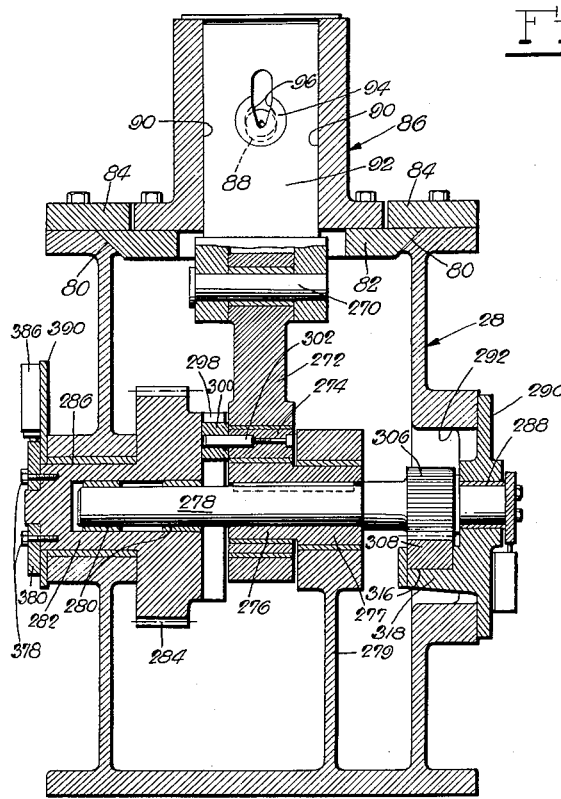
Fig. 6
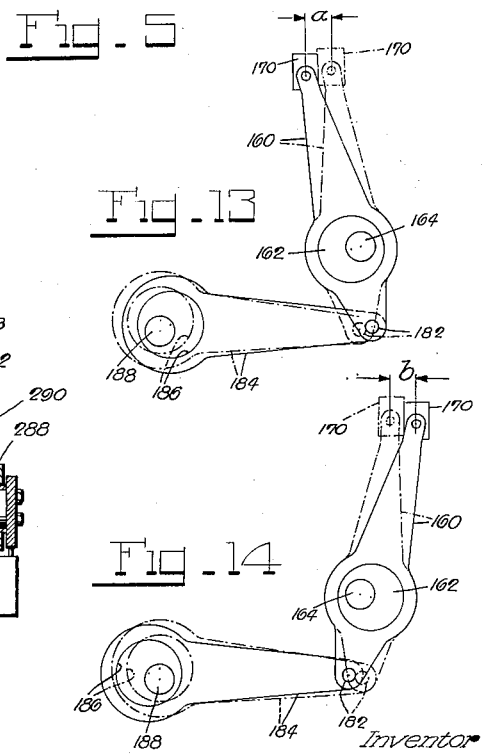
Fig. 13
Fig. 14
Inventor:
Karl William Hallden
by: Steward & Sprueel
Attorneys.

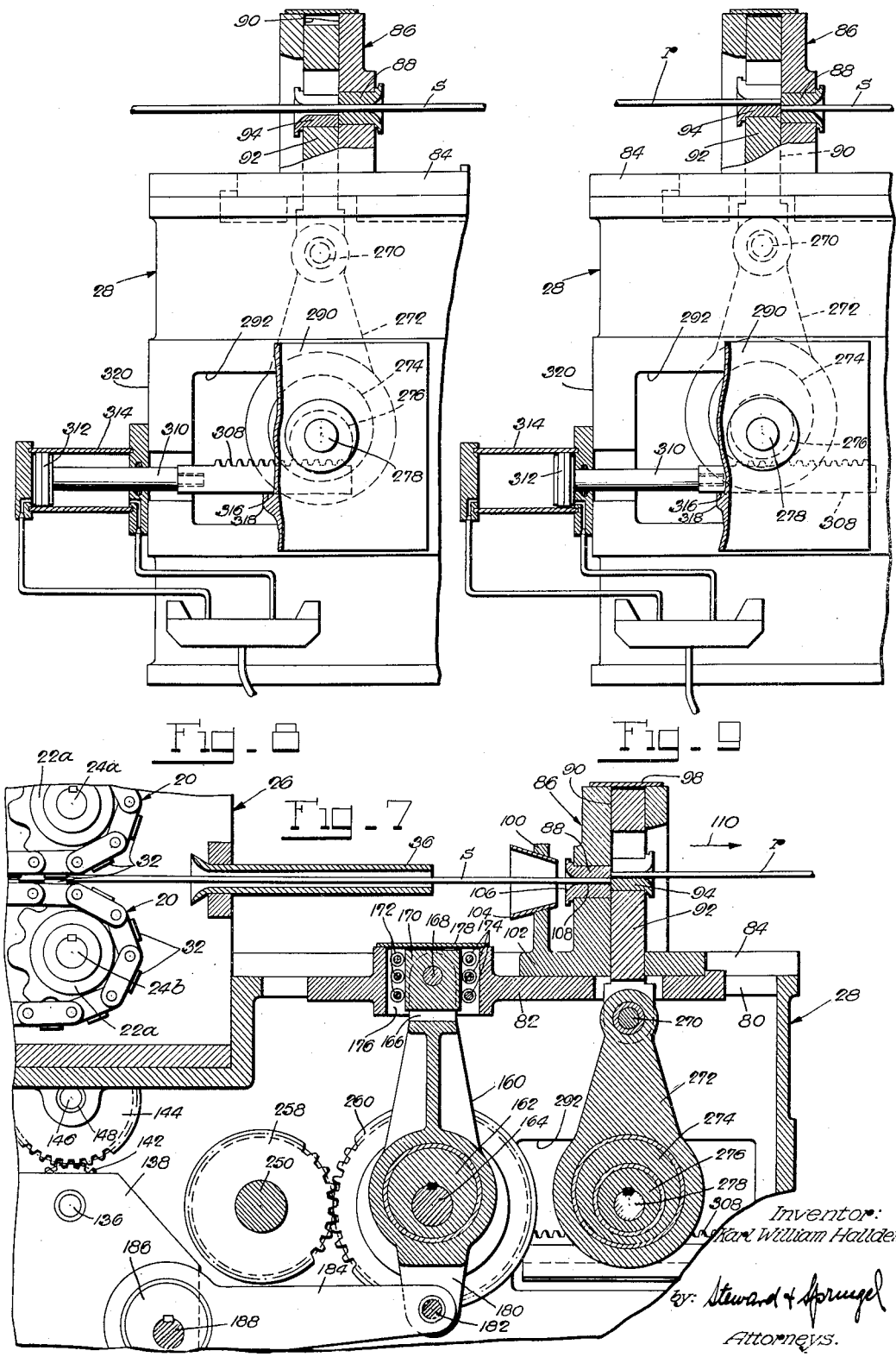

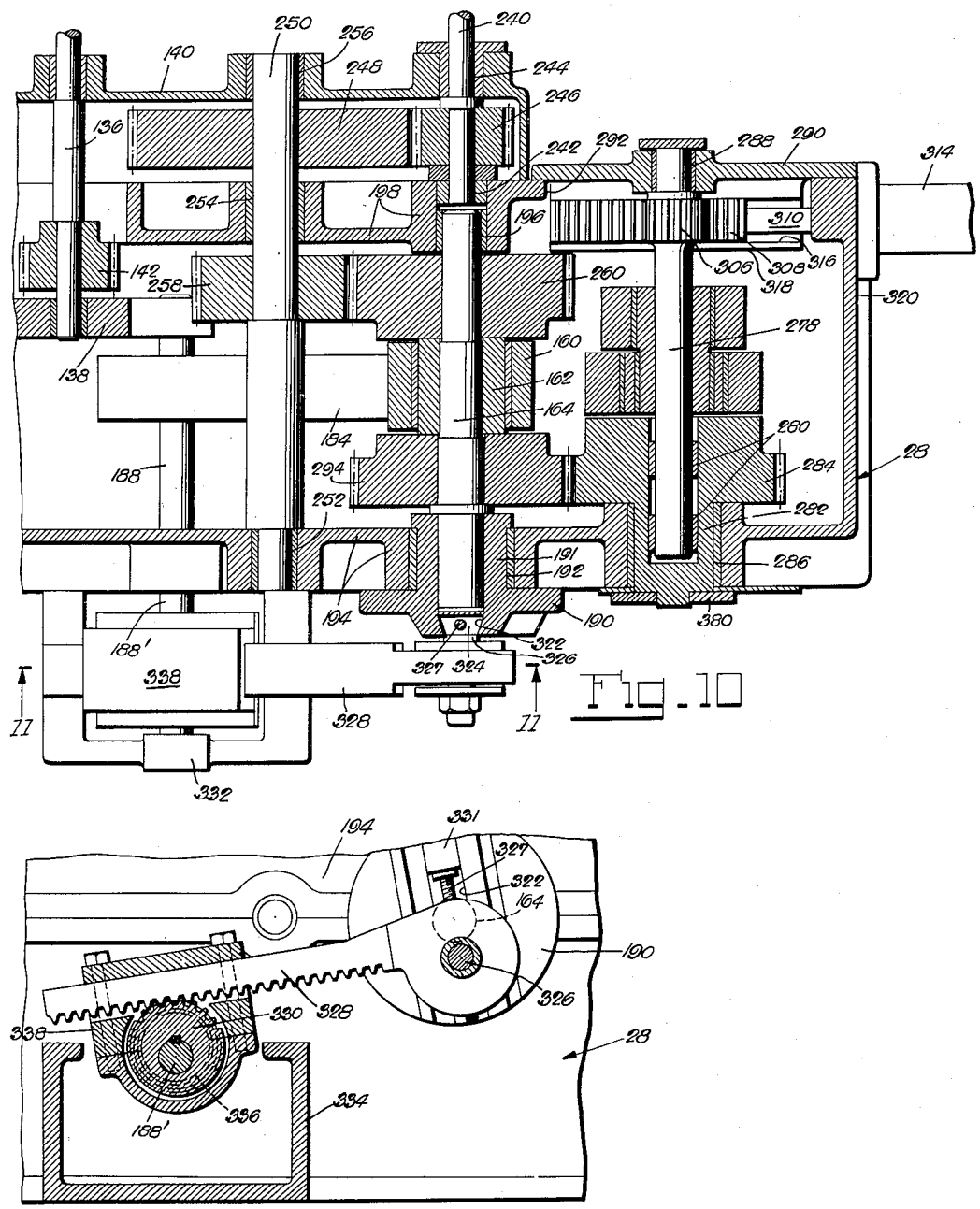

United States Patent Office 2,734,570
Patented Feb. 14, 1956

2,734,570

FLYING SHEARS HAVING PRESELECTED MISS-CUT ACTION

Karl William Hallden, Thomaston, Conn., assignor to The Hallden Machine Company, Thomaston, Conn., a corporation of Connecticut Application April 4, 1952, Serial No. 280,615

12 Claims. (Cl. 164—48)

This invention relates generally to stock-cutting devices, and more particularly to flying shears of the rod-cutting type and a method of cutting rod stock into unit lengths or any desired multiples thereof.

Flying shears are shown and described in my earlier Patents Nos. 1,911,150, 2,144,308 and 2,327,106, dated May 23, 1933, January 17, 1939 and August 17, 1943, respectively. Among these, the shear of Patent No. 1,911,150 is of the same general type as the shear of this invention, to wit, a shear of the rod-cutting type. This previous rod-cutting shear employs a clutch of the over-running type of which the driven part passes, for each cut by the shear, through one revolution in order to drive the cams which cause the shear members to cut the stock and momentarily move the shear head with the constantly fed rod stock during the cutting operation. This clutch is connected for one complete revolution when the leading end of the fed rod stock engages and actuates a tripping mechanism, wherefore it is the forward feed of the stock to the extent of the desired rod length to be cut which controls the performance of the shear head and shear members. However, since the inevitable time lag between the actuation of the tripping mechanism and the performance of the shear members varies somewhat for numerous reasons, and since the rate of advance of the same rod stock through line contact with uniformly driven feed rolls also varies somewhat due to variations of the drag on the rod stock and variations in the cross-sectional dimension of the stock, it is obvious that variations in the lengths of the cut rods would be inevitable, were it not for the additional provision of a positive stop in the path of the fed stock. This positive stop moves with the shear head and is spaced therefrom an adjustable distance exactly equal to the desired rod length to be cut, and the beforementioned tripping mechanism is so coordinated with the positive stop that the leading end of even the shortest rod length which would be cut without the stop provision will engage the stop and be compelled thereby to advance in unison with the shear head at least during the cutting operation. While the stock is thus slightly retarded momentarily by the stop during each rod-cutting operation, slight and harmless slippage between the feed rolls and the rod stock will take place.

While this previous shear performs entirely satisfactorily on rod stock having a relatively low rate of feed, the same fails to perform satisfactorily on stock which is fed at a considerably higher rate such as is required by the industry to meet the demands of ever increasing production capacity. This is due to the fact that the one-revolution clutch for each cycle of operation of the shear head and shear members imposes rather sharply defined limits upon the maximum speed of the performance of this shear. Thus, at the maximum permissible feeding speed of the stock, which is far below the feeding speed now desired by the industry, the clutch has to be engaged at such high speed that the same is subjected to very considerable stresses which are hardly inducive to a long useful life of the clutch. If the feeding speed of the stock is even slightly increased beyond this permissible maximum, the stresses in the clutch and its wear become prohibitive, with the result that the clutch will soon malfunction and break down. Further, while rod stock fed at the maximum permissible rate will not buckle and will permit slippage of the feed rolls on the stock everytime the latter is momentarily retarded by the beforementioned stop, it is possible that the same stock, when fed at considerably higher speed, may sometimes buckle when moving into engagement with this stop. Also, the previous shear, while to all intents and purposes limitless insofar as the possible lengths of cut rods is concerned, increases in size and bulk with increasing rod lengths, due to the provision of the tripping mechanism and positive stop whose spacing from the shear head necessarily increases with increasing lengths of cuts.

Accordingly, it is a primary object of the present invention to provide a flying shear of this type which, in comparison to the previous shear referred to above, will cut accurate lengths of rods from rod stock which may constantly be fed at much higher speeds than heretofore, without subjecting the operating parts of the shear to any harmful stresses or undue wear.

It is another important object of the present invention to provide a flying shear of this type which is neither larger in size nor greater in bulk than the beforementioned previous shear for minimum lengths of cuts, yet permits the cutting of rods of practically limitless lengths.

It is a further important object of the present invention to provide a rod-cutting flying shear which no longer performs under the control of the forward feed of the stock to the extent of the desired rod length to be cut, as heretofore, but which is of the miss-cut type so that the same performs under the control of a preselected miss-cut action in cutting rods which are equal to, or any desired multiple of, a unit length.

Another important object of the present invention is to provide a rod-cutting flying shear which, in addition to the beforementioned variable miss-cut action, has also provisions for cutting rods of unit lengths which are infinitely variable within wide limits so that the shear may cut rods of infinitely variable unit lengths as well as of any desired multiple lengths thereof.

It is a further important object of the present invention to use in conjunction with a rod-cutting flying shear a tractor feed which is known for its positive and uniform feed action on rod stock regardless of variations of the drag on the stock and variations in the cross-sectional dimension of the same stock or different cross-sectional dimensions of different stock, thereby assuredly obtaining cut rods of exactly the same desired lengths.

Other objects and advantages will appear to those skilled in the art from the following, considered in conjunction with the accompanying drawings.

In the accompanying drawings, in which certain modes of carrying out the present invention are shown for illustrative purposes:

Fig. 2 is a side elevation of the same rod-cutting device as viewed in the direction of the arrow 2 in Fig. 1;

Figure 1:
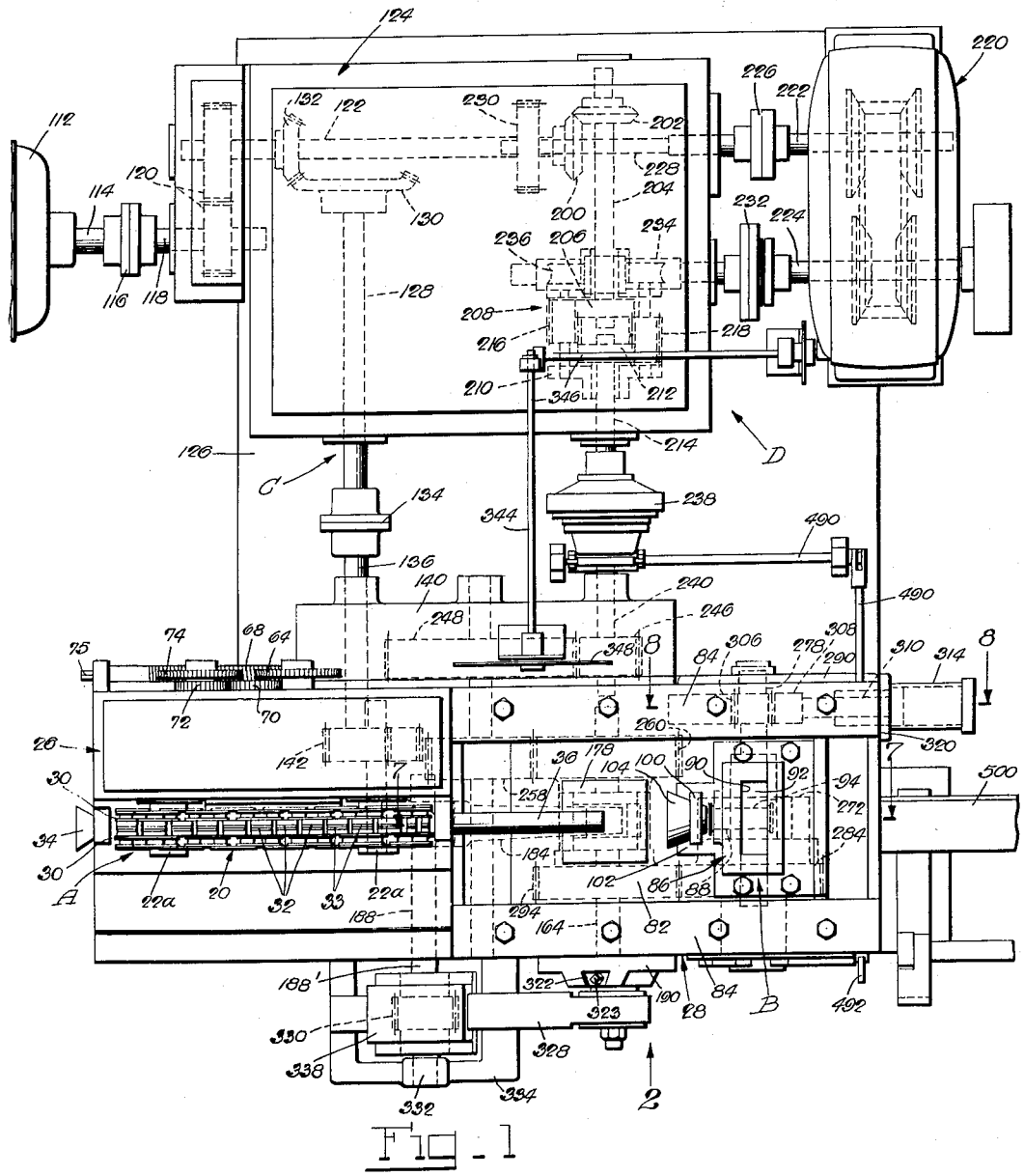
Fig. 1 is a top plan view of a rod-cutting device embodying the present invention.
Figure 12:
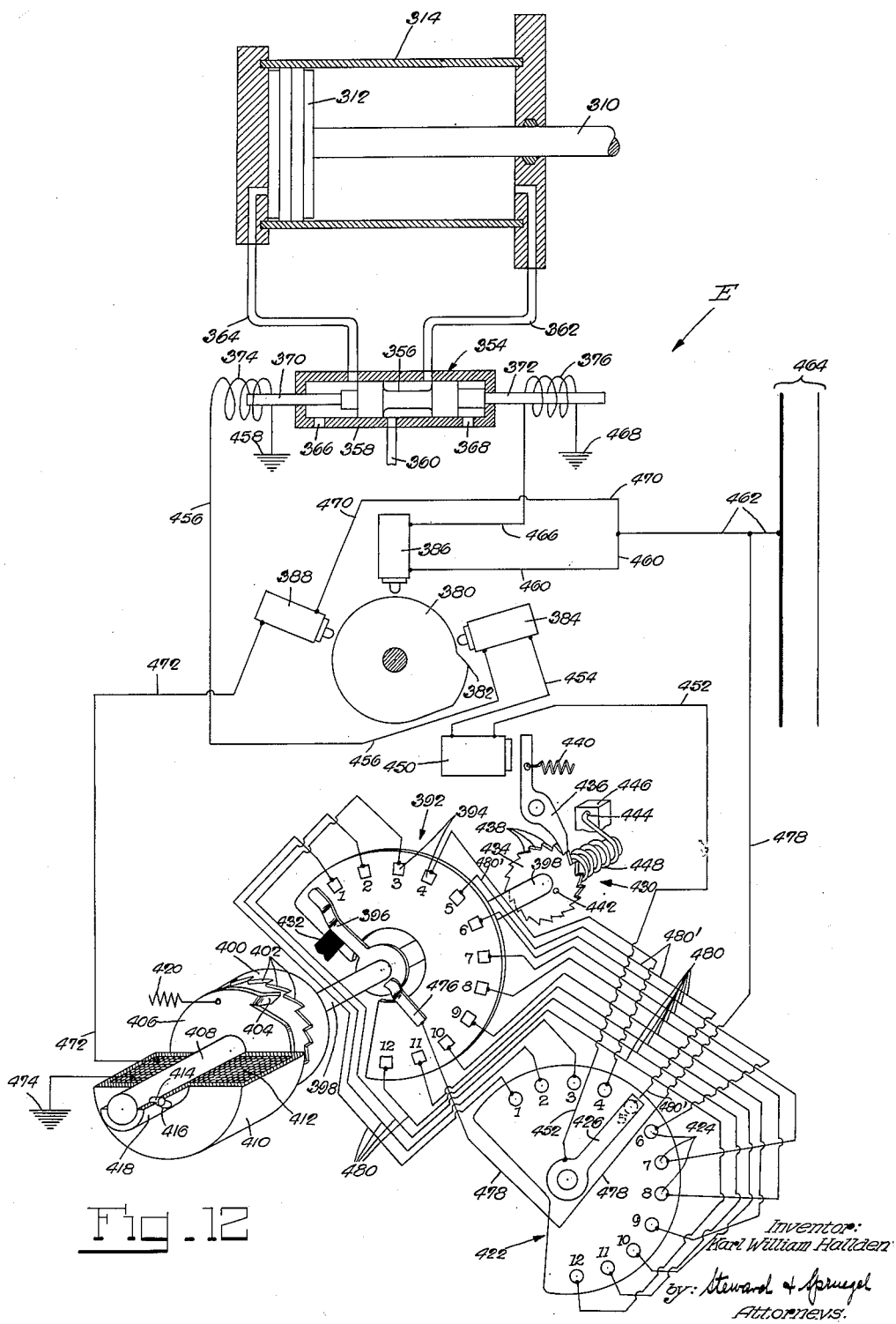

Figs. 3, 4, 5 and 6 are enlarged cross-sections through the rod-cutting device as taken on the lines 3—3, 4—4, 5—5 and 6—6, respectively, of Fig. 2;

Fig. 7 is an enlarged fragmentary longitudinal section through the rod-cutting device as taken on the line 7—7 of Fig. 1;

Fig. 8 is a sectional view, partly in elevation, of a part of the rod-cutting device, the section being taken substantially along the line 8—8 of Fig. 1;

Fig. 9 is a view similar to Fig. 8, and showing certain operating parts in different operating positions;

Fig. 10 is an enlarged fragmentary horizontal section through the rod-cutting device as taken on the line 10—10 of Fig. 2;

Fig. 11 is a fragmentary section taken on the line 11—11 of Fig. 10;

Fig. 12 diagrammatically illustrates a control unit for certain operating mechanism of the rod-cutting device; and Figs. 13 and 14 diagrammatically illustrate certain cooperating parts of the cutting device in different operating positions, respectively.

As shown in Figs. 1 and 2, the instant rod-cutting device has as its main components a tractor feed A, a flying shear B associated therewith, feed-operating means C, shear-operating means D, and a Miss-cut Control Unit E (Fig. 12). The tractor feed A is adapted to feed rod stock $s$ (Fig. 7) at a uniform rate to the flying shear B, and the latter is adapted to cut the continuously fed stock into rods of equal lengths which are infinitely variable within wide limits.

Tractor feed A

Referring to Figs. 1 to 4, the tractor feed A comprises, in the present instance, two chains 20 which are carried by upper and lower pairs of sprockets 22a and 22b, respectively. The sprocket pairs 22a and 22b are so arranged that the adjacent feed runs 20' of the chains thereon are substantially parallel to each other (Fig. 2). The sprockets 22a and 22b are carried by shafts 24a and 24b, respectively, which are journalled in a box-type case 26 on the main frame 28 of the cutting device (Figs. 2 and 4). As shown, the sprockets 22a and 22b are carried by their respective shafts 24a and 24b on the outside of the case 26 so that the feed chains 20 are readily accessible to a new supply of rod stock as well as for adjustment, repair and inspection purposes.

Each of the chains 20 is, in the present instance, of the double-roller type (Fig. 4) and the inner links 30 thereof suitably carry between them feed blocks 32 which are provided in their outer faces with V-shaped grooves 33. The chains 22 are further arranged so that the feed blocks 32 in the adjacent feed runs 20' thereof are aligned in pairs and adapted to grip the rod stock $s$ therebetween for feeding purposes. To this end, the rod stock $s$ is received in the V-grooves 33 in the aligned feed blocks 32 (Figs. 4 and 7) to direct the rod stock through the tractor feed. The rod stock $s$ may conveniently be directed into the tractor feed through a suitable guide sleeve 34 on the case 26. As the fed rod stock $s$ emerges from the tractor feed, it is preferably directed into close proximity to the flying shear B through a guide sleeve 36 on the case 26.

In order that the feed runs 20' of the chains 20 may exert a uniform clamping pressure on the rod stock $s$ for the positive feed of the same without any slippage therebetween the feed blocks 32 in the upper and lower feed runs 20' ride on rollers 40 and 42 which are rotatably mounted at 44 and 46 in upper and lower carriers 48 and 50, respectively (Figs. 2 and 3). The upper carrier 48 is supported on extensions 52 of two spaced parallel shafts 54, respectively, which are journalled in the case 26. The lower carrier 50 is similarly supported on extensions 56 of two spaced parallel shafts 58, respectively, which are also journalled in the case 26. The shaft extensions 52 and 56 are eccentrics which are adapted, on angular adjustment of their respective shafts 54 and 58, to move the carriers 48 and 50 toward and away from each other. Such adjustment of the carriers 48 and 50 serves to cause the rollers 40 and 42 thereon to bring the adjacent feed blocks 32 in the feed runs 20' of the chains into clamping engagement with the rod stock with a force best suited to achieve a positive feed of the stock without marring the same or unduly straining the chains and their drive.

To this end, the eccentrics 52 and 56 are received in longitudinal slots 60 and 62 in the upper and lower carriers 48 and 50, respectively, in the manner shown in Figs. 2 and 3.

In order to turn the eccentrics 52 and 56 for a simultaneous adjustment of the carriers 48 and 50 toward or away from each other, the shafts 54 and 58 of one pair of upper and lower eccentrics 52' and 56', respectively, carry identical worm gears 64 and 66, respectively, which are in permanent mesh with a worm 68 (Fig. 3), while the shafts 54 and 58 of the other pair of upper and lower eccentrics 52" and 56" (Fig. 2) carry gears 70, respectively, which are in permanent mesh with gears 72, respectively, that are rotatable with worm gears 74, respectively (Fig. 1). The worm gears 74 are arranged similarly as the worm gears 64 and 66 (Fig. 3), and are in permanent mesh with the worm 68. The worm 68 and gears 72, 74 are suitably rotatably mounted on the case 26. The gears 70 and 72 of each pair have a speed ratio of one-to-one, and the worm gears 74 are identical with the worm gears 64 and 66, so that the eccentrics 52 and 56 are simultaneously turned in the proper directions to adjust the carriers 48 and 50 toward and away from each other on manual rotation of the worm 68 in opposite directions, respectively, by the use of a suitable wrench, for instance, on the head 75 of the worm 68 (Fig. 1).

Preferably, the uppermost run of the upper chain 20 slides on a ledge 78 on the case 26 (Figs. 2 and 3) to prevent any excessive slack therein which might interfere with the correct and safe performance of the upper chain. Also, any suitable removable protective cover (not shown) may be provided over the tractor feed when the cutting device is in operation.

Flying shear B

Referring now to Figs. 1 and 5 to 7, there is provided in the top of the main frame 28 a longitudinal dovetailed guideway 80 for a slide 82 which is held therein by opposite gibs 84 that are suitably bolted to the main frame 28. Bolted or otherwise secured to the slide 82 is a shear head 86 which carries a fixed sleeve-type shear die or member 88 in alignment with the fed rod stock $s$. The shear head 86 is also provided with a vertical guideway 90 in which is reciprocable a shear gate 92, carrying a shear die or member 94 which is a companion to the fixed shear member 88 in the shear head 86. The movable shear member 94 is, like the fixed shear member 88, of sleeve type, but is cut-away at 96 (Fig. 6) to facilitate the removal of cut rods $r$ therefrom. The guideway 90 in the shear head 86 may conveniently be closed on top by a cover 98. The shear gate 92 is, for each rod-cutting action of the shear members 88 and 94, moved from a retracted position into the cutting position shown in Figs. 7 and 9.

Suitably mounted in an upright wall 100 on the base 102 of the shear head 86 is a guide funnel 104 which serves to direct the leading end of a new supply of rod stock $s$ into the adjacent flared end 106 of the stock-receiving aperture 108 in the fixed shear member 88. A new supply of rod stock may thus be correctly advanced into and beyond the flying shear B without requiring manual guidance of the leading end of the new rod stock by an operator.

The slide 82 and shear head 86 thereon are adapted to be continuously reciprocated in the guideway 80 so that the shear head 86 moves, at least during a portion of each stock-following stroke thereof in the direction of the arrow 110 in Fig. 7, at the same rate as the uniformly fed rod stock $s$. More particularly, and as more fully described hereinafter, the shear head 86 is moved in substantial unison with the fed rod stock at least through a portion of each stock-following stroke thereof during which the shear members 88, 94 perform a rod-cutting operation. As further explained hereinafter also, a rod-cutting action by the shear members 88, 94 may take place at each stock-following stroke of the shear head or at each recurrent stroke following any desired number of stock-following strokes of the shear head. Accordingly, the instant cutting device may be used for cutting from the continuously fed rod stock s rods of identical unit lengths or of any desired multiples of these unit lengths. Aside from the adaptability of the instant device to cut rods of unit lengths or of any desired multiples thereof, the same has also provisions for infinitely varying the unit lengths of cut rods within wide limits.

*Feed operating means C*

Referring now to Fig. 1, there is shown any suitable prime mover, in this instance an electric motor 112 the shaft 114 of which is coupled at 116 to the input shaft 118 of a reduction gearing 120. The output shaft 122 of the reduction gearing 120 extends into and is suitably journalled in a gear box 124 which may suitably be mounted on a base 126 in back of the main frame 28 of the cutting device. Also suitably journalled in the gear box 124 is a shaft 128 which extends at right angles to the shaft 122 and carries a bevel gear 130 which is in permanent mesh with a smaller bevel gear 132 on the shaft 122. Accordingly, the bevel gears 132, 130 afford a further reduction of the drive of the shaft 128. The shaft 128 is coupled at 134 to a shaft 136 of which one end is journalled in an upright wall 138 in the main frame 28 (Figs. 4 and 10), and the other end is journalled in a cover 140 which is bolted or otherwise secured to the main frame 28. The shaft 136 carries within the main frame 28 a gear 142 which is in permanent mesh with another gear 144 on a shaft 146, suitably journalled at 148 in the main frame 28 (Fig. 4). The gear 144 is also in permanent mesh with a gear 150 on one of the lower sprocket-carrying shafts 24b (see also Fig. 2), and the gear 150 is in further permanent mesh with an identical gear 152 on the adjacent upper sprocket-carrying shaft 24a. The gear 150 is in this instance of larger size than the gear 142, thereby affording even a further reduction of the drive of the sprocket shafts 24a and 24b. Thus, on operation of the motor 112, the tractor feed A will be operated through intermediation of the reduction gearing 120, bevel gears 130 and 132, and gears 142, 144, 150 and 152, and the rod stock s will be fed at uniform speed when the motor 112 runs at uniform speed.

*Shear operating means D*

The slide 82 and shear head 86 thereon are reciprocated in the guideway 80 in the main frame 28 by a follower strap 160 on a primary eccentric 162 which is keyed to a transverse shaft 164 in the main frame 28 (Figs. 1, 5, 7 and 10). To this end, the upper bifurcated end 166 of the follower strap 160 pivotally carries at 168 a rectangular block 170 which is reciprocable at right angles to the reciprocatory direction of the slide 82 between opposite sets of rotary rollers 172 and 174 in an aperture 176 in the slide 82. The pivoted block 170 and the rollers 172 and 174 thus form between the follower strap 160 and the slide 82 a pivot connection which is floatable at right angles to the reciprocatory direction of the slide 82. The aperture 176 in the slide 82 is preferably closed on top by a suitably mounted cover 178. The lower end 180 of the follower strap 160 is pivotally connected at 182 with a follower strap 184 on a secondary eccentric 186 which is keyed to a shaft 188 (Fig. 7). Regardless of whether or not the secondary eccentric 186 is rotated, it is clear that the pivot connection 182 between the straps 184 and 160 acts as a fulcrum about which the strap 160 swings back and forth and accordingly reciprocates the slide 82 and shear head 86, on rotation of the primary eccentric 162.

As best shown in Figs. 5 and 10, the shaft 164, which carries the primary eccentric 162, has keyed to one end a crank disc 190 the hub 191 of which is journalled at 192 in a side wall 194 of the main frame 28. The opposite end of the shaft 164 is journalled at 196 in the opposite side wall 198 of the main frame 28. The shaft 188, which carries the secondary eccentric 186, is suitably journalled in the main frame 28 in the upright wall 138 therein and in the side wall 194 thereof.

The drive of the shaft 164, which carries the primary eccentric 162, is as follows. Mounted on the inner end of the shaft 122 in the gear box 124 (Fig. 1) is a bevel gear 200 which is in permanent mesh with a bevel gear 202 on one end of a shaft 204 which is suitably journalled in the gear box 124 and extends at right angles to the shaft 122. The other end of the shaft 204 carries a sun gear 206 of a planetary differential 208 having a frame 210. The planetary differential 208 provides another sun gear 212 on one end of an output shaft 214 which is suitably journalled in the gear box 124 for independent rotation coaxially of the shaft 204. The frame 210 of the planetary differential 208 is freely rotatable on the aligned shafts 204 and 214. Rotatably carried by the frame 210 of the planetary differential 208 are sets of planet gears 216 and 218 of which the gears of each set are in permanent mesh with each other, and are also in permanent mesh with the sun gears 206 and 212, respectively, as in typical planetary gearing. The planetary differential serves to transmit by far the greater portion of the motor power to the shaft 164 as will appear more obvious hereinafter.

Provisions are also made for driving the frame 210 of the planetary differential 208 at infinitely variable speeds within certain limits, thereby to obtain infinitely variable speeds, within certain limits, of the output shaft 214 of the planetary differential. To this end, there is provided an infinitely adjustable speed-ratio unit 220 having an input shaft 222 and an output shaft 224. The speed-ratio unit 220 is a commercial device known as "P. I. V." manufactured by the Link Belt Company of Philadelphia, Pennsylvania, and comprises a sprocket chain arranged in driving relationship with each of two pairs of conical sprocket wheels of which the wheels of each pair are adjustable toward and away from each other for changing the speed of the output shaft 224. Structural details of the speed-ratio unit 220 are not disclosed herein, but are illustrated fully in my prior Patent No. 2,201,581, dated May 21, 1940.

The input shaft 222 of the speed-ratio unit 220 is coupled at 226 to a shaft 228 which is suitably journalled in the gear box 124 and extends parallel to, but spaced from, the shaft 122. The shaft 228 is driven from the shaft 122 through a pair of meshing gears 230. The output shaft 224 of the speed-ratio unit 222 is coupled at 232 to a worm 234 which is suitably journalled in the gear box 124 and in permanent mesh with a worm gear 236 fast on the frame 210 of the planetary differential 208. The speed-ratio unit 220 will transmit only a minor portion of the motor power to the shaft 164.

The speed-ratio unit 220 is presettable so as infinitely to vary the speed of the output shaft 224 thereof and, hence, also the rotary speed of the frame 210 of the planetary differential, within certain limits. Accordingly the output shaft 214 of the planetary differential 208 may be driven at infinitely variable speeds within certain limits, depending on the adjustment of the speed-ratio unit 222.

The output shaft 214 of the planetary differential 208 is drivingly connected by means of a suitable releasable clutch 238 with a shaft 240 which, as shown in Figs. 5 and 10, is journalled at 242 and 244 in the side wall 198 of the main frame 28 and in the cover 140 thereon, respectively. Mounted on the shaft 240 is a gear 246 which is in permanent mesh with a gear 248 carried by a shaft 250 which is journalled at 252, 254 and 256 in the side walls 194 and 198 of the main frame 28 and in the cover 140, respectively. The shaft 250 carries another gear 258 which is in permanent mesh with a gear 260 mounted on the shaft 164. The gears 246, 248, 258 and 260 serve as a further gear reduction in the drive of the shaft 164.

Assuming in the present instance that the secondary eccentric 186 be held against rotation in the angular position shown in Fig. 7 (this being one of the possible conditions of the present cutting device), the slide 82 and shear head 86 will then be reciprocated solely by the rotating primary eccentric 162 which will cause the follower strap 160 to be swung back and forth about the pivot connection 182 between the straps 160 and 184 as a fulcrum. Accordingly, each stroke of the shear head 86 is somewhat similar to a harmonic motion, the shear head reaching maximum speed midway of each stroke and coming gradually to a momentary stop at each stroke reversal.

In most operating conditions of the instant cutting device, the secondary eccentric 186 is oscillated at adjustable amplitudes in timed relation with the drive of the primary eccentric 162, in a manner described hereinafter, in order to impart to the follower strap 160 additional swing motions about the primary eccentric 162 as a fulcrum, for the purpose of obtaining substantially accurate synchronization of the shear head motion with the stock feed during each rod-cutting operation.

The shear gate 92 is, for its reciprocation in the shear head 86, pivotally connected at 270 with a follower strap 272 on a primary eccentric 274 that is freely rotatable on a secondary eccentric 276 which is keyed to a rotary shaft 278. Accordingly, the eccentrics 274 and 276 are arranged in stroke-supplemental relation with each other. The shaft 278 has one end journalled at 280 in the hub 282 of a gear 284 which, in turn, is journalled with its hub 282 in the side wall 194 of the main frame 28 as at 286 (Figs. 6 and 10). The opposite end of the shaft 278 is journalled at 288 in a cover 290 which is removably mounted on, and normally closes an aperture 292 in, the side wall 198 of the main frame 28. The gear 284, which is freely rotatable with respect to the shaft 278 and in permanent mesh with another mounted gear 294 on the shaft 164, is provided in its inner face with a radial groove 298 (Fig. 6) in which is slidably received a block 300 carried at 302 by the primary eccentric 274. The ratio of the gears 284 and 294 is one to one, so that these gears, in conjunction with the groove and block connection 298, 300 between the gear 284 and the primary eccentric 274, drive the latter at the same speed as the shaft 164, but in the opposite direction. The primary eccentrics 162 and 274 are so coordinated that they reach the ends of their respective upward strokes simultaneously as shown in Fig. 7, wherefore the primary eccentric 274 will have imparted its full stroke to the shear gate 92 in rod-cutting direction just when the shear head 86 passes through the middle of each stock-following stroke thereof.

Assuming now that the secondary eccentric 276 is held against rotation in the inoperative angular position shown in Fig. 8 in which its high point is most remote from the shear head 86, then the full upward stroke of the driven primary eccentric 274 is in itself insufficient to bring the shear member 94 in the gate 92 into cutting engagement with the fed rod stock s, and the shear member 94 will, at the end of each upward stroke of the primary eccentric 274, be spaced slightly but clearly from the fed rod stock s in the manner shown in Fig. 8 so as not to scrape against or otherwise mar the stock when not performing a cutting operation. Under these circumstances, i. e. while the secondary eccentric 276 is held in the beforementioned inoperative position (Fig. 8), the movable shear member 94 has a miss-cut action for each revolution of the primary eccentric 274.

In order to bring the movable shear member 94 into stock-cutting relation with the fixed shear member 88 in the shear head 86, the combined strokes of both, the primary eccentric 274 and the secondary eccentric 276 are required. Thus, it is only after the secondary eccentric 276 has been turned into the operative position shown in Fig. 7 that the upward stroke of the primary eccentric 274 is sufficient to bring the movable shear member 94 into rod-cutting relation with the fixed shear member 88, as will now be readily understood.

As best shown in Fig. 6, the secondary eccentric 276 is provided with a relatively long hub 277 which is journalled in an upright wall 279 of the main frame 28, thereby harmlessly transmitting the greater part of the sometimes very considerable shear forces to the main frame and accordingly preventing undue bending stresses in the shaft 278.

In order to turn the secondary eccentric 276 into the operative and inoperative positions shown in Figs. 7 and 8, respectively, the shaft 278 carries a gear 306 (Figs. 6 and 10) which is in mesh with a rack 308 on the rod 310 of a double-acting piston 312 in a cylinder 314 (Figs. 8 and 9). The rack 308 is slidable in a guideway 316 in an inward ledge 318 on the previously mentioned cover 290, and the cylinder 314 is mounted in any suitable manner on an end wall 320 of the main frame 28. On admitting fluid under pressure into the left end of the cylinder 314 and simultaneously venting the right end thereof (Fig. 8), in a manner to be described, the piston 312 and, hence, also the rack 308 will be moved into the position shown in Fig. 9, thereby turning the secondary eccentric 276 into the operative position shown in Figs. 7 and 9. Conversely, on admitting fluid under pressure into the right end of the cylinder 314 and simultaneously venting the left end thereof (Fig. 9), the piston 312 and rack 308 will be moved into the position shown in Fig. 8, thereby turning the secondary eccentric 276 into the inoperative position shown in Fig. 8.

It has been explained hereinbefore that the speed of the output shaft 214 of the planetary differential 208 is infinitely variable within certain limits, due to the interaction between the planetary differential and the presettable speed-ratio unit 220. Accordingly, the rotary speed of the shaft 164, which carries the primary eccentric 162, is similarly variable, though reduced at the fixed ratio of the intermediate gears 246, 248, 258 and 260 (Fig. 10). Keeping in mind that the rod stock s is fed at uniform speed, the shear head 86 may be conditioned for cutting rods of any desired unit lengths by presetting the speed-ratio unit so as to obtain the correct rotary speed of the primary eccentric 162 and, accordingly, the correct rate of reciprocation of the shear head 86. Thus, if rods of relatively large unit lengths are to be cut, the primary eccentric 162 will be rotated at relatively low speed so as to impart to the shear head 86 one reciprocation while the uniformly fed rod stock advances through a distance equal to the relatively large unit length of a rod to be cut. Conversely, if rods of relatively short unit lengths are to be cut, the primary eccentric 162 will be rotated at higher speed so as to impart to the shear head 86 one reciprocation while the uniformly fed rod stock advances through a distance equal to the relatively short unit length of a rod to be cut.

While the adjustment of the speed-ratio unit 220 solely determines the unit length of cut, as pointed out above, it stands to reason that the shear head motion will, at most any selected rate of reciprocation of the shear head, fail to be in synchronism with the stock feed during each cutting or miss-cutting cycle of the shear members 88, 94. Accordingly, provisions are made for readily synchronizing the motion of the shear head 86 with the stock feed at least during each cutting or miss-cutting cycle of the shear members 88 and 94, regardless of the rate of reciprocation of the shear head 86 under the control of the planetary differential 208 and speed-ratio unit 220. To this end, the previously mentioned crank disc 190 is in its outer face provided with a diametric groove 322 (Figs. 5, 10 and 11) which is preferably dovetailed and receives the sliding base 324 of a crank pin 326. The base 324 of the crank pin 326 is threadedly received by an adjustment spindle 327 which is rotatable but axially immovable in a fixed insert 331 in the diametric groove 322. By turning the spindle 322 at the head 323 thereof, the crank pin 326 will be adjusted radially of the crank disc 190. Pivoted on the crank pin 326 is one end of a rack 328 which is in mesh with a gear 330 that is in this instance eccentrically mounted on an outward extension 188' of the previously mentioned shaft 188 (Figs. 10 and 11). The outer end of the shaft extension 188' is preferably journalled at 332 in a bracket 334 which may suitably be secured to the main frame 28. The gear 330 is provided on its opposite sides with concentric bosses 336, respectively, on which is journalled a guide frame 338 that encloses the gear 330 and retains the rack 328 in permanent mesh therewith despite the ensuing wobble motion of the eccentrically mounted gear 330 when the crank disc 190 rotates. As previously mentioned, the secondary eccentric 186 is also mounted on the shaft 188 (Fig. 7). Accordingly, the eccentric 186 will, on each revolution of the crank disc 190, be oscillated once back and forth through intermediation of the crank pin 326, rack 328, gear 330 and shaft 188. The coordination of the primary and secondary eccentrics 162 and 186 is as shown in Fig. 7, i. e., the secondary eccentric 186 will impart to the follower strap 160 a swinging motion of maximum speed about the primary eccentric 162 as a fulcrum, just when the primary eccentric 162 imparts to the strap 160 a swinging motion of maximum speed about the pivot connection 182 between the straps 160 and 184 as a fulcrum.

With the present coordination of the eccentrics 162, 186 and crank disc 190, it stands to reason that the secondary eccentric 186 will at all times, except when held against rotation in the inoperative position shown in Fig. 7 in a manner described hereinafter, increase or decrease the invariable stroke of the shear head 86 as caused by the primary eccentric 162 alone. Considering as a first example that the crank pin 326 be adjusted as shown in Fig. 11 and that the primary eccentric 162 be driven clockwise as viewed in Fig. 7, the full line position of the follower strap 160 in Fig. 13 then coincides with the starting position of the shear head 86 for its next work-following stroke. Thus, on continued clockwise rotation of the primary eccentric 162 from the position shown in Fig. 13 into that shown in Fig. 14, the same will swing the strap 160 clockwise until the shear head 86 has completed its work-following stroke. However, during such clockwise rotation of the primary eccentric 162 the crank disc 190 is similarly driven to cause the secondary eccentric to swing from the end position shown in Fig. 13 counterclockwise into the opposite end position in Fig. 14. If the secondary eccentric 186 were held stationary in its inoperative position as shown in dot-and-dash lines in Figs. 13 and 14, the above-mentioned clockwise rotation of the primary eccentric 162 would result in a swing of the follower strap 160 from the dot-and-dash line position in Fig. 13 into the dot-and-dash line position in Fig. 14, corresponding to a normal work-following stroke of the shear head 86 as caused solely by the primary eccentric 162. However, since the secondary eccentric 186 is also swung as described above, the mentioned normal stroke of the shear head 86 will be increased by the increments *a* and *b* (Figs. 13 and 14). The fact that the normal stroke of the shear head 86 is thus increased by the action of the secondary eccentric 186 is of no import, the important aspect of the combined actions of both eccentrics 162 and 186 being that they impart to the follower strap 160 such component swinging motions that the resultant swinging motion of this strap will bring about substantially accurate synchronization of the shear head motion with the uniform stock feed at least during each cutting or miss-cutting cycle of the shear members 88, 94.

While the adjustment of the speed-ratio unit 220 and of the crank pin 326 on the crank disc 190 in the preceding example (Fig. 11) brought about the cutting of rods of a certain unit length each, longer rods may be cut by adjusting the speed-ratio unit to slow the rate of reciprocation of the shear head 86. In that case, correct synchronization of the shear head motion with the uniform stock feed at the proper recurrent intervals would necessitate outward adjustment of the crank pin 326 on the crank disc 190 from the position thereon shown in Fig. 11. Conversely, if the speed-ratio unit 220 is adjusted for faster reciprocation and accordingly shorter lengths of cuts, correct synchronization of the shear head motion with the uniform stock feed at the proper recurrent intervals would necessitate inward adjustment of the crank pin 326 on the crank disc 190 from the position thereon shown in Fig. 11. However, as long as the crank pin 326 is anywhere on the same side of the rotary axis of the crank disc 190 as shown in Fig. 11, the action of the secondary eccentric 186 will increase the normal stroke of the shear head 86. The secondary eccentric will be held against rotation in the inoperative position (Fig. 7) when the crank pin 326 is adjusted on the crank disc 190 in coaxial alignment therewith.

For cutting even shorter rod lengths, the speed-ratio unit 220 is adjusted so as to further increase the rate of reciprocation of the shear head 86 to the extent that the speed of the latter on each normal work-following stroke thereof is, during each cutting cycle of the shear members 88 and 94, in excess of the uniform stock feed. Accordingly, the component swing motion imparted by the secondary eccentric 186 to the follower strap 160 must be such as to counteract the component swing motion imparted by the primary eccentric 162 to the same strap 160, to such an extent that the resultant swing motion of the strap 160 will bring about substantially accurate synchronization of the shear head motion with the uniform stock feed at least during each cutting or miss-cutting cycle of the shear members 88, 94. This is accomplished by adjusting the crank pin 326 on the crank disc 190 in a position intermediate the rotary axis of the latter and the insert 331 in the diametric groove 322 therein. In that case, the component swing motion imparted by the secondary eccentric 186 to the follower strap 160 is subtractive from the normal component swing motion imparted by the primary eccentric 162 to the same strap 160, and the over-all stroke of the shear head will also be decreased from the normal stroke thereof as caused by the primary eccentric 162 alone, as will now be readily understood.

Taking now into consideration that the shear members 88 and 94 have finished their cutting action on the rod stock *s* considerably before the primary and secondary eccentrics 162 and 186 reach the respective angular positions shown in Fig. 7, it stands to reason that the primary eccentric 162 will during actual stock-cutting impart a rapidly accelerating swing motion to the follower strap 160, and the secondary eccentric 186 would, in the absence of a provision to be described presently, similarly impart a rapidly accelerating swing motion to the same strap 160 during actual stock cutting, so that the rate of the resultant swing motion of the strap 160 and, hence, the rate of the shear motion, would vary noticeably at the very time when the shear motion should be in substantially accurate synchronism with the uniform stock feed. This slight, though noticeable, error in the correct synchronization of the shear head motion with the uniform stock feed during stock cutting may be corrected, or at least mitigated to the point where the shear head motion is to all practical intents and purposes in synchronism with the uniform stock feed, by eccentrically mounting the gear 330 on the shaft extension 188' as described. In thus eccentrally mounting the gear 330 on the shaft extension 188', the swinging motion imparted to the follower strap 160 by the secondary eccentric 186 at least during each cutting or miss-cutting cycle of the shear members 88, 94 will be substantially uniform rather than accelerating, despite the drive of the secondary eccentric 186 from the crank disc 190. Accordingly, the resultant swinging motion of the follower strap 160 will be such that the motion of the shear head 86 will, at least during each cutting or miss-cutting cycle of the shear members 88 and 94, be substantially uniform and in sufficiently accurate synchronism with the uniform stock feed to permit the shear members to perform clean stock-cutting operations without causing the stock to buckle.

The adjustment of the speed-ratio unit 220 for a desired unit length of cut may greatly be facilitated as well as expedited, by providing a rotary shaft 344 of a suitable adjustment drive 346 of the speed-ratio unit 220 with a readily accessible dial plate 348 (Figs. 1 and 2) having graduations 350 which correspond to different unit lengths of cuts and which may selectively be turned into full or near registry with a fixed pointer 352 to thereby adjust the speed-ratio unit 220 for cutting rods of desired unit lengths.

*Miss-cut control unit E*

The present cutting device has also a presettable control unit for achieving any desired number of miss-cut actions of the movable shear member 94 in order to obtain rod lengths which are desired multiples of any one of the infinitely variable unit lengths of cuts. Fig. 12 diagrammatically illustrates the presettable miss-cut control unit, as well as the previously mentioned cylinder 314 and a control valve 354 therefor. The position of the piston 312 in the cylinder 314 corresponds with that shown in Fig. 8 in which the secondary eccentric 276 is in its inoperative position, and the sliding valve element 356 in the casing 358 of the control valve 354 is accordingly shown in position to admit fluid under pressure to the right end of the cylinder 314 and permit venting of the left end thereof. Thus, fluid under pressure from an inlet conduit 360 is admitted by the valve element 356 into a conduit 362 which is in communication with the right end of the cylinders 314, while the other end of the cylinder is through a conduit 364 in communication with a vent passage 366 in the valve casing 358. Conversely, on shifting the valve element 356 into its opposite position, fluid under pressure from the inlet conduit 360 will be admitted by the valve element 356 into the conduit 364 and to the left end of the cylinder 314, while the right end of the cylinder will be vented by way of the conduit 362 and another vent passage 368 in the valve casing 358. Extending from the opposite ends of the valve element 356 are plungers 370 and 372 of solenoids having windings 374 and 376, respectively. Accordingly, the valve element 356 will be shifted into the position illustrated in Fig. 12 on energization of the solenoid winding 376, and the valve element 356 will be shifted into its opposite position on energization of the solenoid winding 374.

Mounted at 378 on the hub 282 of the gear 284 is a cam disc 380 (Figs. 2, 6, 10 and 12) which accordingly passes through one complete revolution for each revolution of the primary eccentric 274 (Fig. 7). The cam disc 380 is provided with a rise 382 and is adapted, during each revolution in counterclockwise direction as viewed in Figs. 2 and 12, successively to close normally open snap switches 384, 386 and 388 which are suitably mounted on a fixed panel 390 on the main frame 28 (Figs. 2 and 6).

The control unit further comprises a step and selector switch arrangement, an example of which is shown in Fig. 12. It is to be understood, however, that any other switch arrangement of this type may be adapted for the instant control means, and that the instantly shown step and selector switch arrangement does not form any part of the invention. The instant step switch 392 comprises a plurality of equiangularly spaced fixed contacts 394, and a movable contact 396 on a rotary shaft 398. The shaft 398 carries a ratchet wheel 400 having teeth 402 which are spaced the same as the fixed contacts 394. A pawl 404 is adapted to cooperate with the teeth 402 of the ratchet wheel 400 in indexing the movable contact 396 intermittently into engagement with successive fixed contacts 394 in clockwise direction as viewed in Fig. 12. The pawl 404 is in this instance formed on a disc 406 on a plunger 408 which is independently rotatable coaxially of the shaft 398 and axially slidable in a casing 410 that houses a solenoid winding 412. The plunger 408 carries a pin 414 which is received in a cam slot 416 in a hub-like formation 418 of the solenoid casing 410, so that the pawl 404 will simultaneously be moved into engagement with a ratchet tooth 402 and rotated clockwise for indexing the movable contact 396 through one step every time the solenoid winding 412 is energized. On deenergization of the solenoid winding 412, a spring 420 will turn the pawl 404 counterclockwise, the pin 414 and cam slot 416 then cooperating to retract the pawl 404 from engagement with the ratchet wheel 400.

Associated with the step switch 392 is a manual selector switch 422 having as many fixed contacts 424 as there are fixed contacts 394 on the step switch 392. The selector switch 422 has also a manually turnable contact 426 which may be brought into engagement with either one of the fixed contacts 424.

Associated with the step switch 392 is a quick-return mechanism 430 which, when released, will turn the movable contact 396 of the step switch 392 counterclockwise out of engagement with the fixed contacts 394 thereof into the position shown in Fig. 12 in which the same bears against an insulated stop 432. The mechanism 430 comprises a ratchet disc 434 which is mounted on the shaft 398 and cooperates with a pivoted holding pawl 436 which is normally urged into engagement with the ratchet teeth 438 by a spring 440. Surrounding the shaft 398 and anchored with its opposite ends 442 and 444 in the ratchet disc 434 and a fixed member 446, respectively, is a prewound torsion spring 448 which is further wound up when the movable contact 396 of the step switch 392 is turned clockwise into engagement with successive fixed contacts 394 thereof. Associated with the holding pawl 436 is a solenoid 450 which, when energized, retracts the pawl 436 from holding engagement with the ratchet disc 434 to permit the quick-return of the movable contact 396 into the starting position shown in Fig. 12 under the compulsion of the torsion spring 448.

One side of the winding of the solenoid 450 is connected by a lead 452 with the movable contact 426 of the selector switch 422, while the other end of this solenoid winding is connected by a lead 454 with one side of the snap switch 384. The other side of the switch 384 is connected by a lead 456 with one end of the solenoid winding 374, the other end of which is grounded as at 458. One side of the next step switch 386 is connected by leads 460 and 462 with the positive side of any suitable electric current source 464, while the other side of the switch 386 is connected by a lead 466 with one end of the solenoid winding 376, the other end of which is grounded as at 468. One side of the next snap switch 388 is connected by leads 470 and 462 with the positive side of the electric current source 464, while the other side of the switch 388 is connected by a lead 472 with one end of the solenoid winding 412, the other end of which is grounded as at 474.

In permanent engagement with the movable contact 396 of the step switch 392 is a brush-type contact 476 which through leads 478 and 462 is connected with the positive side of the electric current source 464.

The fixed contacts 394 and 424 of the step and selector switches 392 and 422, respectively, are for convenience successively numbered and the identically numbered contacts of these switches are connected by leads 480, respectively.

Assuming that the selector switch 422 has been preset for four miss-cut actions of the shear members 88, 94 between successive cutting actions thereof, by having turned the movable contact 426 of the selector switch 422 into engagement with the No. 5 contact 424 thereof as shown in Fig. 12, and further assuming that the cutting device is in operation and a rod-cutting action has just been performed by the shear members during the preceding revolution of the primary eccentric 274 and, hence, of the cam disc 380, it is well to state in advance that the secondary eccentric 276 and the movable contact 396 of the step switch have simultaneously been returned to their respective inoperative and starting positions (Figs. 8 and 12) and the movable step switch contact 396 has again been indexed into engagement with the No. 1 contact 394, before the end of this preceding revolution of the cam disc 380. Under these conditions, the rise 382 on the cam disc 380 will, during the following revolution of the latter in counterclockwise direction as viewed in Fig. 12, first close the switch 384. Such closure of the switch 384 at this time will not accomplish anything since the circuit of the latter is then open. The rise 382 of the cam disc 380 will next close the switch 386, thereby momentarily closing the circuit of the solenoid winding 376. Energization of the solenoid winding 376 at this time has no effect on the valve element 356 since the latter is then in its right end position (Fig. 12) which corresponds to the then inoperative position of the secondary eccentric 276 (Fig. 8). Next, the rise 382 of the cam disc 380 will, near the end of the present revolution of the latter, close the switch 388, thereby momentarily closing the circuit of the solenoid winding 412, with the result that the movable contact 396 of the step switch 392 is indexed through its next step into engagement with the No. 2 contact 394 thereof.

During each of the next three revolutions of the cam disc 380 the switches 384, 386 and 388 will again be successively closed, with the result that the solenoid winding 376 will each time be briefly energized without having any effect on the instant position of the valve element 356, while the movable contact 396 of the step switch 392 will be indexed step by step into successive engagement with the Nos. 3, 4 and 5 contacts 394 thereof. During these indexing steps of the movable contact 396 of the step switch 392 the ratchet disc 434 has been turned clockwise through the same number of steps, thereby further winding up the torsion spring 448, the holding pawl 436 meanwhile cooperating with the ratchet disc 434 to prevent the quick return of the movable contact 396 of the step switch into the starting position shown in Fig. 12.

When the movable contact 396 of the step switch has come into engagement with the No. 5 contact 394 thereof, the cam disc 380 will, during its next revolution, first close the switch 384, thereby closing the circuit in which the latter and the winding of the solenoid 450 are connected in series, for a sufficient length of time to energize the solenoid winding 374 for a shift of the valve element 356 into its other end position, and also to activate the solenoid 450 for the retraction of the holding pawl 436 from the ratchet disc 434 and the quick return of the movable contact 396 of the step switch into its starting position. The shift of the valve element 356 into its other end position will bring about a stroke of the piston 312 into its right end position and, accordingly, turning of the secondary eccentric 276 into its operative position (Fig. 7). The circuit which is then closed by the switch 384 comprises the leads 462 and 478, the brush-type contact 476, the movable contact 396 and the then engaged No. 5 contact 394 of the step switch 392, lead 480' which connects the No. 5 contacts 394 and 424 of the step and selector switches 392 and 422, respectively, the movable contact 426 of the selector switch, lead 452, the winding of the solenoid 450, lead 454, switch 384, lead 456 and the solenoid winding 374. Thus, immediately on closure of the switch 384 by the cam disc 380, the secondary eccentric 276 is turned from its inoperative position into its operative position, and the primary eccentric 274 will be turned toward and into its full stroke-supplemental relation with the secondary eccentric 276 (Fig. 7) and cause a stock-cutting performance by the shear members 88 and 94, before the cam 380 closes the next switch 386. The cam disc 380 will next close the switch 386 for momentary energization of the solenoid winding 376, causing this time a shift of the valve element 356 into the position shown in Fig. 12 for the return of the secondary eccentric 276 into its inoperative position. Next, the cam disc 308 will, still during the same revolution but near the end thereof, close the switch 388 for momentary energization of the solenoid winding 412 and according indexing of the movable contact 396 of the step switch into engagement with the No. 1 contact 394 thereof, concluding thereby a full rod-cutting cycle of the device during which a rod has been cut which is five times the length of the particular unit length of cut for which the device has previously been adjusted by suitable adjustment of the speed-ratio unit 220. The step switch 392 will now repeat the cycle just described, and bring about four successive miss-cut actions of the shear members 88 and 94 before their next stock-cutting action.

It will now be readily understood that rods of any other multiple of a unit length may be cut by simply bringing the movable contact 426 of the selector switch 422 into engagement with the correspondingly numbered contact 424 thereof.

Assuming now that no miss-cut actions of the shear member 94 are desired and that rods of unit lengths are to be cut from the stock, then the movable contact 426 of the selector switch 422 is set so as to be in engagement with the No. 1 contact 424 thereof. In any event, the last function of the cam disc 380 near the end of the last revolution thereof was the closure of the switch 388 and according indexing of the movable contact 396 of the step switch into engagement with the No. 1 contact 394 thereof. During the following revolution of the cam disc 380 the same will first close the switch 384, causing thereby rotation of the secondary eccentric 276 into its operative position (Fig. 7) and quick return of the movable contact 396 of the step switch into its starting position. While the secondary eccentric 276 is thus in its operative position, the primary eccentric 274 will pass toward and into full stroke-supplemental relation therewith for a stock-cutting action by the shear members 88 and 94. Next, the cam disc 380 will, during the same revolution, close the switch 386 for a sufficient length of time to effect the return of the secondary eccentric 276 into its inoperative position (Fig. 8). Finally, the cam disc 380 will, near the end of the same revolution thereof, close the switch 388 so as to cause indexing of the movable contact 396 of the step switch into engagement with the No. 1 contact 394 thereof, preliminary to the next succeeding revolution of the cam disc 380 during which the shear members 88, 94 will cooperate to cut another rod of unit length.

*Mode of operation*

Let it now be assumed that the speed-ratio unit 220 has been set for a desired unit length of cut and that the crank pin 326 has been correctly adjusted on the crank disc 190 so that the shear head motion will, at least during each cutting cycle of the shear members 88 and 94, be in substantially accurate synchronism with the known uniform stock feed, and assume further that the instant cutting device is presently at a standstill and that new rod stock will have to be introduced into the cutting device before normal operation of the latter may be resumed. In that case, the leading end of the new rod stock is passed through the guide sleeve 34 (Figs. 1 and 2) and between the nearest pair of aligned feed blocks 32 on the adjacent feed runs 20' of the chains 20, and more particularly into the aligned V-grooves 33 in these blocks. The leading end of the rod stock may then be power-fed through the tractor feed A by starting the motor 112. The stock-receiving V-grooves 33 in the aligned feed blocks 32 on the adjacent feed runs of the chains 20 will correctly direct the stock through the tractor feed and prevent any swerving therefrom. As the power-fed stock emerges from the tractor feed A, it will pass through the guide sleeve 36 and be directed thereby into the guide funnel 104 which, in turn, will direct the leading end of the rod stock into and beyond the fixed shear die 88 in the shear head 86. The power-feed of the leading end of the new rod stock into and through the fixed shear die 88 in the shear head 86 will be facilitated if the latter is held stationary in a position in which the movable shear member 94 is retracted from the shear die 88. To this end, there is provided suitable operating linkage 490, including a readily accessible handle 492 (Figs. 1 and 2) for disconnecting the clutch 238 on pulling the handle 492 outwardly. Disengagement of the clutch 238 will interrupt the drive of the shaft 240 and, accordingly, stop the reciprocation of the shear head 86 and of the shear gate 92 in their respective guideways.

After the new rod stock is thus introduced in the cutting device, the clutch 238 may be reengaged by pushing the handle 492 inwardly, whereupon rods of the desired unit lengths will be cut from the rod stock. As the rod stock is fed beyond the shear head 86 for each subsequent rod-cutting operation, it passes over a suitable support 500 on which the rods will drop as they are cut and from which they will be dumped out of the way of the next advancing stock length. The rod support 500 does not form any part of the present invention, wherefore no further details thereof are disclosed.

The rod stock will, during operation of the motor 112, be fed at a uniform rate by the tractor feed A, and the shear head 86 will continuously be reciprocated in the guideway 80 in the main frame 28 of the cutting device by the combined action of the primary and secondary eccentrics 162 and 186, respectively, on the follower strap 160 (Fig. 7). Inasmuch as the movable contact 426 of the selector switch 422 is set in engagement with the No. 1 contact 424 thereof for the cutting of rods of unit lengths, the secondary eccentric 276 will, at each revolution of the associated primary eccentric 274, be turned by the gear 306, rack 308 and piston 312 into its operative position (Fig. 7) so as to be in correct stroke-supplemental relation with the primary eccentric 274 for a rod-cutting action by the shear members 88 and 94. As already mentioned, the crank pin 326 is so adjusted on the crank disc 190 that the resultant swing motion of the follower strap 160 will bring about substantially accurate synchronization of the shear head motion with the uniform stock feed at least during each cutting cycle of the shear members 88, 94.

Should it now be desired to cut rods of which the length of each rod is a certain multiple of the unit length of the preceding example, say for instance five times this unit length, then the only adjustment required will be the setting of the movable contact 426 of the selector switch 422 in engagement with the No. 5 contact 424 thereof. With this setting of the selector switch 422, four miss-cut actions of the shear members 88, 94 will take place between successive cutting actions thereof.

Should it now be desired to cut rods of unit lengths which are different from the unit lengths of the rods cut in the first example, then the movable contact 426 of the selector switch 422 is set in engagement with the No. 1 contact 424 thereof, and the speed-ratio unit 220 is adjusted, preferably with the aid of the dial plate 348 (Fig. 2), so that the ensuing rate of reciprocation of the shear head 86 corresponds to the desired unit length of cut. Further, the crank pin 326 will be adjusted on the crank disc 190 so as to bring about substantially accurate synchronization of the shear head motion with the uniform stock feed at least during each rod-cutting cycle of the shear members 88, 94. The cutting device is now conditioned for the cutting of rods of the selected unit lengths, and rods of this unit length will be cut as long as the device is in operation and rod stock fed thereto.

It will be appreciated from the preceding that the instant cutting device secures many important advantages over previous cutting devices of this type, including the cutting device disclosed in my beforementioned prior Patent No. 1,911,150. Thus, while the maximum permissible stock feed rate of my previous cutting device was in the neighborhood of 125 feet per minute, the actual stock feed rate of a cutting device of the present invention was measured at over 300 feet per minute, and the device performed entirely satisfactorily. It is to be understood, however, that the stock-feed rate of over 300 feet per minute is given only as an example and by no means as a limitation, especially since the maximum permissible stock feed rate of this new cutting device is known to exceed 300 feet per minute, but has not as yet been determined. Nevertheless, the increase of the stock feed rate of the instant cutting device over previous cutting devices is great, and this increased stock feed rate meets even the most exacting demands of the industry for faster performance of cutting devices of this type. Responsible for this vast increase in the stock feed rate is, of course, the continuously reciprocating flying shear and its synchronous motion with the fed stock at least during each cutting cycle of the shear members.

Despite the much increased stock feeding rate afforded by the instant cutting device, the rod lengths cut thereby are exactly alike. This is due to the coordination with the constantly reciprocating flying shear of a tractor feed. Thus, the constantly reciprocating flying shear will assuredly cut rods of equal lengths as long as the stock feed is uniform, and the tractor feed is known for its positive and uniform feed action on rod stock regardless of variations of the drag on the stock and variations in the cross-sectional dimension of the same stock or different cross-sectional dimensions of different stock.

The instant cutting device, by being of the variable miss-cut type, need be neither larger in size nor greater in bulk than previous shears of a size for cutting rods of minimum lengths, yet the instant cutting device lends itself to the cutting of rods of practically limitless lengths. The instant cutting device also lends itself to the cutting of rods of unit lengths which are infinitely variable within wide limits, and by being of the variable miss-cut type lends itself further to the cutting of rods the lengths of which are any desired multiple of any one of the infinitely variable unit lengths.

The provision of the dual eccentrics in stroke-supplemental relation with each other for the operation of the movable shear member, and their specific coordination during each cutting or miss-cutting cycle of the shear members, enables the present cutting device to perform an almost limitless number of miss-cuts between successive cutting actions thereof and, accordingly, to cut rods within an almost limitless range of lengths of cuts, assuredly without scraping or buckling the continuously fed rod stock during miss-cut actions of the shear members. Underlying this feature is a method involving a constant drive of one of these eccentrics; holding the other eccentric, during each revolution of the one eccentric at which a miss-cut action is desired, against rotation in an angular position in which the combined stroke of both eccentrics in the operating direction of the movable shear member is insufficient to move the latter into stock-cutting relation with its companion shear member; and turning the other eccentric, during any revolution of the one eccentric at which a stock-cutting action is desired, into and from another angular position in which the combined stroke of both eccentrics in the operating direction of the movable shear member is sufficient to move the latter into rod-cutting relation with its companion shear member. Both, the above method and the shear member-operating eccentrics with their specific performance, are by no means limited for use in rod-cutting devices and are not intended to be so limited, but they may be used with equal advantage, and are fully intended for use, in shears which cut any kind of stock, such as sheet or band stock, for instance.

The instant rod-cutting device lends itself to the cutting of rod-stock of most any cross-sectional shape and also of any cross-sectional dimension within limits. The construction of the instant cutting device also permits its exceptionally high operating speed without setting up any undue stresses in or causing undue wear of, the operating parts thereof. The construction of the instant cutting device also affords ready accessibility to the various operating parts thereof for their adjustment, inspection, repair or replacement.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A rod-cutting device of the miss-cut type, comprising a frame carrying companion shear members of which one member is movable into and from a shearing position in which the same is in rod-cutting relation with the other member; two independently rotatable eccentrics arranged in stroke-supplemental relation with each other and drivingly connected with said one member for moving the same into said shearing position only when said eccentrics are in stroke-supplemental relation with each other in the shearing direction of said one member; means for driving one of said eccentrics; a cylinder; a movable piston therein having a driving connection with the other eccentric for turning the latter into and from stroke-supplemental relation with said one eccentric in said shearing direction on movement of said piston in opposite directions, respectively; presettable mechanism operative only during each recurring revolution of said one eccentric following a variable number of revolutions of the latter for admitting fluid under pressure into said cylinder to move said piston in one said opposite directions for cutting action of said members; and means for moving said piston in the other of said opposite directions.

2. A rod-cutting device of the miss-cut type as set forth in claim 1, in which said piston is double-acting, and said mechanism is operative during each of said recurring revolutions of said one eccentric for admitting fluid under pressure successively into the opposite ends of said cylinder to move said piston in said one direction for a cutting action of said shear members, and then in said other direction.

3. A rod-cutting flying shear of the miss-cut type, comprising a rectilinearly reciprocable frame carrying companion shear members of which one member is movable transversely of the reciprocatory direction of said frame into and from a shearing position in which the same is in rod-cutting relation with the other member; two eccentrics independently rotatable about parallel axes at right angles to the reciprocatory direction of said frame and arranged in stroke-supplemental relation with each other; a driving link connection between said eccentrics and said one member for moving the latter into said shearing position only when said eccentrics are in stroke-supplemental relation with each other in the shearing direction of said one member; means for reciprocating said frame and for driving one of said eccentrics so that the latter passes through one complete revolution for each reciprocation of said frame; a cylinder; a movable piston therein having a driving connection with the other eccentric for turning the latter into and from stroke-supplemental relation with said one eccentric in said shearing direction on movement of said piston in opposite directions, respectively; presettable mechanism operative only during each recurring revolution of said one eccentric following a variable number of revolutions of the latter for admitting fluid under pressure into said cylinder to move said piston in one of said opposite directions for a cutting action of said members; and means for moving said piston in the other of said opposite directions.

4. A flying shear for cutting rods of variable lengths from uniformly fed rod stock, comprising a rectilinearly reciprocable frame carrying companion shear members for relative movement into and from stock-cutting relation with each other; an eccentric rotary about an axis at right angles to the reciprocatory direction of said frame; a follower strap journalled on said eccentric and having with said frame a pivot connection floatable at right angles to said reciprocatory direction; means for driving said eccentric at variable speeds; mechanism including a pivot connection with said strap about which the latter swings as a fulcrum on rotation of said eccentric for the reciprocation of said frame, said mechanism being operated in timed relation with said eccentric and presettable to impart to said strap for each revolution of said eccentric an oscillation of variable amplitude about the turning eccentric as a fulcrum so that said strap moves said frame during a portion of each stock-following stroke thereof substantially at the uniform feeding rate of the stock regardless of the rotary speed of said eccentric; and means for causing relative movement of said shear members into and from stock-cutting relation with each other during stock-following stroke portions of said frame.

5. A flying shear as set forth in claim 4, in which said mechanism is presettable to impart to said strap oscillations of amplitudes variable between zero and a maximum.

6. A device for cutting rods of variable lengths from uniformly fed rod stock, comprising a tractor feed having two sets of sprockets carrying chains, respectively, so that adjacent runs thereof are substantially parallel and sufficiently spaced to grip rod stock therebetween for feeding the same when the chains are properly driven; power means for driving certain of said sprockets to cause stock feed at a uniform rate; a frame rectilinearly reciprocable in the feeding direction of the stock and carrying companion shear members for relative movement into and from stock-cutting relation with each other; an eccentric rotary about an axis at right angles to the reciprocatory direction of said frame; a follower strap journalled on said eccentric and having with said frame a pivot connection floatable at right angles to said reciprocatory direction; means for driving said eccentric at variable speeds; mechanism including a pivot connection with said strap about which the latter swings as a fulcrum on rotation of said eccentric for the reciprocation of said frame, said mechanism being operated in timed relation with said eccentric and presettable to impart to said strap for each revolution of said eccentric an oscillation of variable amplitude about the turning eccentric as a fulcrum so that said strap moves said frame during a portion of each stock-following stroke thereof substantially at the uniform feeding rate of the stock regardless of the rotary speed of said eccentric; and means for causing relative movement of said shear members into and from stock-cutting relation with each other duing stock-following stroke portions of said frame.

7. A miss-cut-type flying shear for cutting rods of variable lengths from uniformly fed rod stock, comprising a rectilinearly reciprocable frame carrying companion shear members of which one member is movable at right angles to the reciprocatory direction of said frame into and from a shearing position in which the same is in stock-cutting relation with the other member; a first eccentric rotary about an axis at right angles to the reciprocatory direction of said frame; a follower strap journalled on said eccentric and having with said frame a pivot connection floatable at right angles to said reciprocatory direction; means for driving said eccentric at variable speeds; mechanism including a pivot connection with said strap about which the latter swings as a fulcrum on rotation of said eccentric for the reciprocation of said frame, said mechanism being operated in timed relation with said eccentric and presettable to impart to said strap for each revolution of said eccentric an oscillation of variable amplitude about the turning eccentric as a fulcrum so that said strap moves said frame during a portion of each stock-following stroke thereof substantially at the uniform feeding rate of the stock regardless of the rotary speed of said eccentric; two other eccentrics independently rotatable about parallel axes at right angles to said reciprocatory direction and arranged in stroke-supplemental relation with each other, one of said other eccentrics being driven at a one-to-one ratio with said first eccentric; a driving link connection between said other eccentrics and said one shear member for moving the latter into said shearing position only when said other eccentrics are in stroke-supplemental relation with each other in the shearing direction of said one member; and other presettable mechanism operated in timed relation with said one eccentric for turning the remaining one of said other eccentrics into stroke-supplemental relation with said one eccentric in said shearing direction during each recurring revolution of the latter following a variable number of revolutions thereof for causing a cutting action of said shear members every time said frame passes through said stock-following stroke portion during each of said recurring revolutions of said one eccentric.

8. A stock-cutting device, comprising companion shear members of which one member is movable into and from a shearing position in which the same is in stock-cutting relation with the other member; two independently rotatable eccentrics arranged in stroke-supplemental relation with each other and drivingly connected with said one member for moving the same into said shearing position only when said eccentrics are substantially in maximum stroke-supplemental relation with each other in the shearing direction of said one member; a power drive for one of said eccentrics; power means for turning the other eccentric; and presettable mechanism operated in timed relation with said power drive for causing said power means to turn said other eccentric substantially into and from maximum stroke-supplemental relation with said one eccentric in said shearing direction during a single revolution of the latter following a variable number of preceding revolutions of the same during which said other eccentric is non-rotating, thereby causing movement of said one member into said shearing position after a corresponding number of movements of the same into a position short of said shearing position.

9. A stock-cutting device as set forth in claim 8, in which said mechanism is presettable to cause said power means to turn said other eccentric during a single revolution of said one eccentric following preceding revolutions of the latter of a number variable between zero and a maximum.

10. A stock-cutting device of the miss-cut type, comprising companion shear members of which one member is movable into and from a shearing position in which the same is in stock-cutting relation with the other member; two independently rotatable eccentrics arranged in stroke-supplemental relation with each other and drivingly connected with said one member for moving the same into said shearing position only when said eccentrics are substantially in maximum stroke-supplemental relation with each other in the shearing direction of said one member; a power drive for one of said eccentrics; power means for turning the other eccentric; and presettable mechanism operated in timed relation with said power drive for causing said power means to turn said other eccentric substantially into and from maximum stroke-supplemental relation with said one eccentric in said shearing direction during each recurring revolution of the latter following a variable number of revolutions of the same during which said other eccentric is non-rotating, thereby causing cutting actions of said members after corresponding number of identical miss-cut actions of the same.

11. A stock-cutting device of the miss-cut type as set forth in claim 10, in which said mechanism is presettable to cause said power means to turn said other eccentric during each recurring revolution of said one eccentric following revolutions of the latter of a number variable between zero and a maximum.

12. A stock-cutting flying shear of the miss-cut type, comprising a rectilinearly reciprocable frame carrying companion shear members of which one member is movable transversely of the reciprocatory direction of said frame into and from a shearing position in which the same is in stock-cutting relation with the other member; two eccentrics independently rotatable about parallel axes at right angles to said reciprocatory direction and arranged in stroke-supplemental relation with each other; a driving link connection between said eccentrics and said one member for moving the latter into said shearing position only when said eccentrics are substantially in maximum stroke-supplemental relation with each other in the shearing direction of said one member; a device for reciprocating said frame and for driving one of said eccentrics so that the latter passes through one complete revolution for each reciprocation of said frame; power means for turning the other eccentric; and presettable mechanism operated in timed relation with said device for causing said power means to turn said other eccentric substantially into and from maximum stroke-supplemental relation with said one eccentric in said shearing direction during each recurring revolution of the latter following a variable number of revolutions thereof during which said other eccentric is non-rotating, thereby causing stock-cutting actions of said members after corresponding numbers of identical miss-cut actions thereof.

References Cited in the file of this patent

UNITED STATES PATENTS

| | | |
|---|---|---|
| 911,548 | Sturtevant | Feb. 2, 1909 |
| 1,836,712 | Hallden | Dec. 15, 1931 |
| 1,878,121 | Edwards | Sept. 20, 1932 |
| 2,144,308 | Hallden | Jan. 17, 1939 |
| 2,220,236 | Haegele | Nov. 5, 1940 |
| 2,261,007 | Talbot | Oct. 28, 1941 |
| 2,327,106 | Hallden | Aug. 17, 1943 |
| 2,339,456 | Budlong | Jan. 18, 1944 |
| 2,341,494 | Williamson | Feb. 8, 1944 |
| 2,642,937 | Hallden | June 23, 1953 |

FOREIGN PATENTS

| | | |
|---|---|---|
| 140,440 | Great Britain | June 9, 1921 |